(12) United States Patent
Lee

(10) Patent No.: US 10,286,362 B2
(45) Date of Patent: May 14, 2019

(54) EXTENDABLE PRESSURIZED-TYPE HOLLOW FIBER MEMBRANE MODULE AND FILTRATION APPARATUS MANUFACTURED USING THE SAME

(71) Applicant: KOLON INDUSTRIES, INC., Gwacheon-si, Gyeonggi-do (KR)

(72) Inventor: Ah Reum Lee, Yongin-si (KR)

(73) Assignee: KOLON INDUSTRIES, INC., Seoul (KR)

( * ) Notice: Subject to any disclaimer, the term of this patent is extended or adjusted under 35 U.S.C. 154(b) by 0 days.

(21) Appl. No.: 15/555,576

(22) PCT Filed: Mar. 4, 2016

(86) PCT No.: PCT/KR2016/002166
§ 371 (c)(1),
(2) Date: Sep. 5, 2017

(87) PCT Pub. No.: WO2016/144047
PCT Pub. Date: Sep. 15, 2016

(65) Prior Publication Data
US 2018/0050308 A1    Feb. 22, 2018

(30) Foreign Application Priority Data
Mar. 6, 2015 (KR) .......... 10-2015-0031340

(51) Int. Cl.
*B01D 63/08* (2006.01)
*B01D 63/02* (2006.01)
(Continued)

(52) U.S. Cl.
CPC ......... *B01D 63/024* (2013.01); *B01D 63/046* (2013.01); *B01D 69/08* (2013.01);
(Continued)

(58) Field of Classification Search
None
See application file for complete search history.

(56) References Cited

U.S. PATENT DOCUMENTS

| 5,045,198 A * | 9/1991 | Norton | B01D 61/18 210/321.87 |
| 2009/0008318 A1 * | 1/2009 | Anes | C02F 9/00 210/262 |
| 2011/0049026 A1 * | 3/2011 | Ryu | B01D 63/024 210/110 |

FOREIGN PATENT DOCUMENTS

KR    10-0740047 B1    7/2007
KR    10-2009-0104152 A    10/2009
(Continued)

OTHER PUBLICATIONS

International Search Report for PCT/KR2016/002166 dated Jun. 17, 2016 [PCT/ISA/210].

*Primary Examiner* — Chester T Barry
(74) *Attorney, Agent, or Firm* — Sughrue Mion, PLLC

(57) ABSTRACT

Disclosed are an extendable pressurized-type hollow fiber membrane module which facilitates improvement of filtrate quality through a multistep-filtration, enhanced easiness of installation and maintenance, decrease of footprint, and/or enlargement of filtration apparatus (without causing decrease of permeate flux of a unit hollow fiber membrane), and a filtration apparatus manufactured using the same. The filtration apparatus of the present invention comprises first and second pressurized-type hollow fiber membrane modules, wherein an inlet port of the first pressurized-type hollow fiber membrane module for introducing feed water and an outlet port of the second pressurized-type hollow fiber membrane module for discharging filtrate or air are coupled to each other.

9 Claims, 4 Drawing Sheets

(51) Int. Cl.
*B01D 69/08* (2006.01)
*B01D 63/04* (2006.01)
*C02F 1/44* (2006.01)

(52) U.S. Cl.
CPC ............ *C02F 1/44* (2013.01); *B01D 2313/10* (2013.01); *B01D 2313/16* (2013.01); *B01D 2313/19* (2013.01); *B01D 2313/21* (2013.01); *B01D 2313/54* (2013.01); *B01D 2317/022* (2013.01); *B01D 2317/025* (2013.01)

(56) References Cited

FOREIGN PATENT DOCUMENTS

| | | |
|---|---|---|
| KR | 10-2012-0052006 A | 5/2012 |
| KR | 10-2012-0122381 A | 11/2012 |
| KR | 10-2012-0140329 A | 12/2012 |
| KR | 10-1440756 B1 | 9/2014 |
| KR | 10-2014-0132612 A | 11/2014 |

* cited by examiner

EXTENDABLE PRESSURIZED-TYPE HOLLOW FIBER MEMBRANE MODULE AND FILTRATION APPARATUS MANUFACTURED USING THE SAME

CROSS REFERENCE TO RELATED APPLICATIONS

This application is a National Stage of International Application No. PCT/KR2016/002166, filed on Mar. 4, 2016, which claims priority from Korean Patent Application No. 10-2015-0031340, filed on Mar. 6, 2015, the contents of all of which are incorporated herein by reference in their entirety.

TECHNICAL FIELD

The present invention relates to an extendable pressurized-type hollow fiber membrane module and a filtration apparatus manufactured using the same, and more particularly, to an extendable pressurized-type hollow fiber membrane module which facilitates (i) improvement of filtrate quality through a multistep-filtration, (ii) enhanced easiness of installation and maintenance, (iii) decrease of footprint, and/or (iv) enlargement of filtration apparatus (without causing decrease of permeate flux of a unit hollow fiber membrane), and a filtration apparatus manufactured using the same.

BACKGROUND ART

Separation methods for water treatment include a method using heat or phase-change, a method using a filtering membrane, and so on. Among the advantages of the method using a filtering membrane is the high reliability of water treatment since the water of desired purity can be easily and stably obtained by adjusting the pore size of the filtering membrane. Furthermore, since the method using a filtering membrane does not require a heating process, it can be used together with microorganisms which are useful for separation process but vulnerable to heat.

Among the methods using a filtering membrane is a method using a hollow fiber membrane module comprising a bundle of hollow fiber membranes. Typically, a hollow fiber membrane module has been widely used in the field of microfiltration for obtaining axenic water, drinking water, super pure water, and so on. Recently, the application of the hollow fiber membrane module is being extended to wastewater treatment, solid-liquid separation in a septic tank, removal of suspended solid (SS) from industrial wastewater, filtration of river, filtration of industrial water, filtration of swimming pool water, and the like.

The hollow fiber membrane module may be classified into a submerged-type module and a pressurized-type module in accordance with the driving method.

The submerged-type module performs the filtration operation while submerged in a water to be treated. Particularly, as the negative pressure is applied to the inside of the hollow fiber membrane, only the fluid component is allowed to pass through the hollow fiber membrane and enter the inside (lumen) thereof. As a result, the pollutants such as the impurities and sludge contained in the water are separated from the filtrate. The submerged-type module is advantageous in that it does not require additional facilities for circulating the water, and thus the cost of equipment itself as well as the operation cost can be reduced. On the other hand, it has a drawback in that the permeate flux obtainable per a unit time is limited.

On the contrary, although requiring additional facilities for circulating the water, the pressurized-type module pressurizing the water from the outside to the inside of the hollow fiber membrane is advantageous in that its permeate flux obtainable per a unit time is greater than that of the submerged-type module.

As illustrated respectively in the Korean patent application laid-open publication Nos. 10-2012-0122381 and 10-2012-0140329 filed by the present applicant, in a conventional pressurized-type hollow fiber membrane module, both ends of a hollow fiber membrane disposed inside a case are potted in different fixing parts respectively. In other words, since the body portion of the hollow fiber membrane performing a filtration process is positioned between the two fixing parts in the case, when the hollow fiber membrane is damaged, it is impossible to repair it, and thus the entire module should be discarded.

In order to increase the treatment capacity of the filtration apparatus, it may be considered to increase both lengths of the case and hollow fiber membrane therein. The longer the length of the hollow fiber membrane is, however, the greater the frictional force which prevents the filtrate flow along the lumen of the hollow fiber membrane is, thereby decreasing the permeate flux of the hollow fiber membrane.

As another method to increase the treatment capacity of the filtration apparatus without increasing the length of the hollow fiber membrane, it may be considered to connect a plurality of pressurized-type modules in parallel. Such method, however, requires more complicated water-circulating facilities, and thus makes it more difficult to install a filtration apparatus. Furthermore, it also requires the increase of footprint of the filtration apparatus.

DISCLOSURE

Technical Problem

Therefore, the present invention is directed to an extendable pressurized-type hollow fiber membrane module capable of preventing these limitations and drawbacks of the related art, and a filtration apparatus manufactured using the same.

An aspect of the present invention is to provide a filtration apparatus which facilitates improvement of filtrate quality through a multistep-filtration, enhanced easiness of installation and maintenance, decrease of footprint, and/or enlargement of filtration apparatus (without causing decrease of permeate flux of a unit hollow fiber membrane).

Another aspect of the present invention is to provide an extendable pressurized-type hollow fiber membrane module which facilitates improvement of filtrate quality through a multistep-filtration, enhanced easiness of installation and maintenance, decrease of footprint, and/or enlargement of filtration apparatus (without causing decrease of permeate flux of a unit hollow fiber membrane).

Additional aspects and features of the present invention will be set forth in part in the description which follows and in part will become apparent to those having ordinary skill in the art upon examination of the following or may be learned from practice of the invention. The objects and additional advantages of the present invention may be realized and accomplished by such structures as illustrated in the drawings, as explained in the detailed description of the invention, and as specified by the claims.

Technical Solution

In accordance with the aspect of the present invention, there is provided a filtration apparatus comprising: a first pressurized-type hollow fiber membrane module; and a second pressurized-type hollow fiber membrane module, wherein, the first pressurized-type hollow fiber membrane module comprises: a first case including a first inlet port for introducing feed water thereinto and a first outlet port for ventilation or discharging filtrate therefrom; and first hollow fiber membranes in the first case, the second pressurized-type hollow fiber membrane module comprises: a second case including a second inlet port for introducing feed water thereinto and a second outlet port for ventilation and discharging filtrate therefrom; and second hollow fiber membranes in the second case, and the first inlet port of the first pressurized-type hollow fiber membrane module and the second outlet port of the second pressurized-type hollow fiber membrane module are coupled to each other so that the first and second pressurized-type hollow fiber membrane modules are in fluid communication with each other.

In accordance with another aspect of the present invention, there is provided an extendable pressurized-type hollow fiber membrane module comprising: a case including a feed water inlet port, a filtrate outlet port, and an air outlet port for ventilation; a fixing part disposed inside the case, the fixing part dividing an inner space of the case into a non-filtration space and a filtration space, the filtration space configured to receive feed water to be treated through the feed water inlet port, at least a portion of the non-filtration space being in fluid communication with the filtrate outlet port; a hollow fiber membrane in the filtration space, both ends of the hollow fiber membrane being potted in the fixing part in such a way that the hollow fiber membrane are in fluid communication with the at least a portion of the non-filtration space; and a tube crossing the at least a portion of the non-filtration, the air outlet port and the filtration space being in fluid communication with each other through the tube.

It should be understood that both the aforementioned general description and the following detailed description are just to illustrate or explain the present invention and to provide a more detailed explanation about the claimed subject matters.

Advantageous Effects

According to the present invention, since both ends of a hollow fiber membrane disposed in a case are potted in the same fixing part, a certain part of the case can be detached to expose the body portion of the hollow fiber membrane which is supposed to perform a filtration process. Therefore, when one of the hollow fiber membranes is damaged, the damaged hollow fiber membrane can be repaired, and thus the life period of the module can be extended without deteriorating the filtration efficiency.

Further, according to one embodiment of the present invention, pressurized-type hollow fiber membrane modules are serially connected so that a multistep-filtration (e.g., for microfiltration, ultrafiltration, etc.) in which filtrate produced by a front module is filtered again by a back module can be carried out. Such multistep-filtration can further improve the quality of the filtrate.

In addition, according to the present invention, the only thing required to do is to serially connect the pressurized-type hollow fiber membrane modules, and thus a filtration apparatus can be easily assembled/installed. Furthermore, the water treatment capacity of the filtration apparatus can be improved without increasing the footprint of the apparatus and length of the hollow fiber membrane.

Additionally, non-uniform aeration cleaning and relatively rapid contamination of the hollow fiber membranes caused thereby can be prevented by a distribution plate of a hollow fiber membrane module of the present invention

BRIEF DESCRIPTION OF DRAWINGS

The accompanying drawings, which are included to provide a further understanding of the invention and are incorporated in and constitute a part of this application, illustrate embodiment(s) of the invention and, together with the description, serve to explain the principle of the invention. In the drawings.

MODE FOR INVENTION

The following description just illustrates the principle of the present invention. Although not explicitly explained or illustrated in this specification, a variety of embodiments for realizing the principle of the present invention (i.e., the embodiments within the scope of the present invention) may be made by a person of ordinary skill in the art. Accordingly, all the embodiments illustrated in this specification are only to provide assistance in understanding the present invention, and the present invention is not limited thereto.

When the present invention is explained, detailed description of the related art will be omitted if such description might unnecessarily obscure the gist of the present invention.

Hereinafter, a variety of embodiments of the filtration apparatus and hollow fiber membrane module of the present invention will be described in detail with reference to the annexed drawings.

Figure 1:
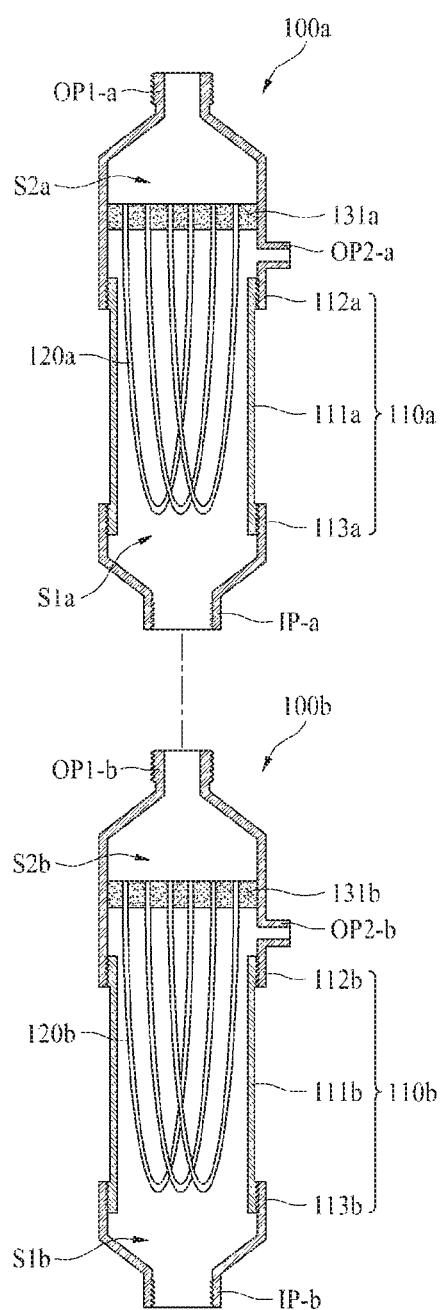
FIG. 1 schematically shows hollow fiber membrane modules according to the first embodiment of the present invention and a filtration apparatus manufactured using the same.

FIG. 1 schematically shows hollow fiber membrane modules (100a, 100b) according to the first embodiment of the present invention and a filtration apparatus manufactured using the same.

As illustrated in FIG. 1, the filtration apparatus according to the first embodiment of the present invention comprises first and second hollow fiber membrane modules (100a, 100b).

The first pressurized-type hollow fiber membrane module (100a) comprises a first case (110a) including a first inlet port (IP-a) for introducing feed water (and air for aeration cleaning) (i.e., first feed water inlet port) and a first outlet port (OP1-a) for discharging filtrate (i.e., first filtrate outlet port), and first hollow fiber membranes (120a) in the first case (110a). The first case (110a) further comprises a first air outlet port (OP2-a) for ventilation.

The first case (110a) comprises a first tubular body (111a) both ends of which are open, a first upper cap (112a) detachably coupled to one end of the first tubular body (111a) and having the first filtrate outlet port (OP1-a), and a first lower cap (113a) detachably coupled to the other end of the first tubular body (111a) and having the first feed water inlet port (IP-a).

A first fixing part (131a) is disposed in the first upper cap (112a). Alternatively, the first fixing part (131a) may be disposed in the first tubular body (111a). The first fixing part (131a) may be formed of polymer such as polyurethane resin, silicon resin, epoxy resin, and etc. The first fixing part (131a) is watertightly adhered to the inner circumferential surface of the first upper cap (112a) or first tubular body (111a).

The first fixing part (131a) divides the inner space of the first case (110a) into a filtration space (S1a) and non-filtration space (S2a). That is, the non-filtration space (S2a) is defined by the first upper cap (112a) and first fixing part (131a), and the filtration space (S1a) is defined by the first fixing part (131a), first tubular body (111a), and first lower cap (113a).

The filtration space (S1a) is configured to receive the feed water to be treated through the first feed water inlet port (IP-a), and the non-filtration space (S2a) is in fluid communication with the first filtrate outlet port (OP1-a).

Both ends of each first hollow fiber membrane (120a) are potted in the first fixing part (131a). The body portion of the first hollow fiber membrane (120a) which performs the filtering process is disposed in the filtration space (S1a). The first hollow fiber membrane (120a) is in fluid communication with the non-filtration space (S2a) through the both ends thereof which are open. In other words, the filtrate passing through the body portion of the first hollow fiber membrane (120a) within the filtration space (S1a) flows into the non-filtration space (S2a) via the first hollow fiber membrane 120a.

The polymer that can be used for manufacturing the first hollow fiber membrane (120a) comprises at least one of polysulfone, polyethersulfone, sulfonated polysulfone, polyvinylidene fluoride (PVDF), polyacrylonitrile, polyimide, polyamideimide, and polyesterimide. The first hollow fiber membrane (120a) may be a single-layer membrane or a composite membrane. When the first hollow fiber membrane (120a) is a composite membrane, it may comprise a tubular braid and a polymer thin film coated thereon. The tubular braid may be made of polyester or nylon.

Since both ends of the first hollow fiber membrane (120a) are potted in the same first fixing part (131a) and the first upper cap (112a) and first lower cap (113a) are detachably coupled to the first tubular body (111a), the body portion of the first hollow fiber membrane (120a) which performs the filtering process can be exposed by detaching the first upper cap (112a) and/or first lower cap (113a) from the first tubular body (111a). Hence, when any one of the first hollow fiber membranes (120a) is damaged, the damaged hollow fiber membrane can be repaired (e.g., by patching or soldering), and thus the life period of the module (100a) can be extended without deteriorating the filtration efficiency thereof.

As shown in FIG. 1, the first upper cap (112a) has a first air outlet port (OP2-a) which is in fluid communication with the filtration space (S1a) for ventilation (and for discharging overflow/concentrated water). Alternatively, the first air outlet port (OP2-a) may be provided on the upper part of the first tubular body (111a) rather than on the first upper cap (112a).

The second pressurized-type hollow fiber membrane module (100b) has a structure almost identical with that of the first pressurized-type hollow fiber membrane module (100a). That is, the second pressurized-type hollow fiber membrane module (100b) comprises a second case (110b) including a second inlet port (i.e., second feed water inlet port) (IP-b) for introducing feed water and a second outlet port (i.e., second filtrate outlet port) (OP1-b) for discharging the filtrate, and second hollow fiber membranes (120b) in the second case (110b).

As illustrated in FIG. 1, the first inlet port (IP-a) of the first pressurized-type hollow fiber membrane module (100a) and the second outlet port (OP1-b) of the second pressurized-type hollow fiber membrane module (100b) are coupled to each other so that the first and second pressurized-type hollow fiber membrane modules (100a, 100b) can be in fluid communication with each other. For this sake, the second outlet port (OP1-b) of the second pressurized-type hollow fiber membrane module (100b) may be inserted into the first inlet port (IP-a) of the first pressurized-type hollow fiber membrane module (100a), and vice versa.

For example, as shown in FIG. 1, the second outlet port (OP1-b) of the second pressurized-type hollow fiber membrane module (100b) may have a thread on the outer circumferential surface thereof and the first inlet port (IP-a) of the first pressurized-type hollow fiber membrane module (100a) may have a thread groove on the inner circumferential surface thereof. On the contrary, the first inlet port (IP-a) of the first pressurized-type hollow fiber membrane module (100a) may have a thread on the outer circumferential surface thereof and the second outlet port (OP1-b) of the second pressurized-type hollow fiber membrane module (100b) may have a thread groove on the inner circumferential surface thereof.

The aforementioned filtration apparatus according to the first embodiment of the present invention can carry out a multistep-filtration. For instance, the first hollow fiber membranes (120a) may be hollow fiber membranes for ultrafiltration and the second hollow fiber membranes (120b) may be hollow fiber membranes for microfiltration. The filtrate produced by the second hollow fiber membranes (120b) of the second module (100b) through the microfiltration process passes the second filtrate outlet port (OP1-b) and the first feed water inlet port (IP-a) sequentially, and then enters the filtration space (S1a) of the first module (100a). Subsequently, the ultrafiltration process is performed by the first hollow fiber membranes (120a). Consequently, the quality of the filtrate coming out of the first module (100a) via the first filtrate outlet port (OP1-a) can be further improved.

Hereinafter, referring to FIG. 2, the hollow fiber membrane modules (200a, 200b) according to the second embodiment of the present invention and a filtration apparatus manufactured using the same will be described in detail.

Figure 2:
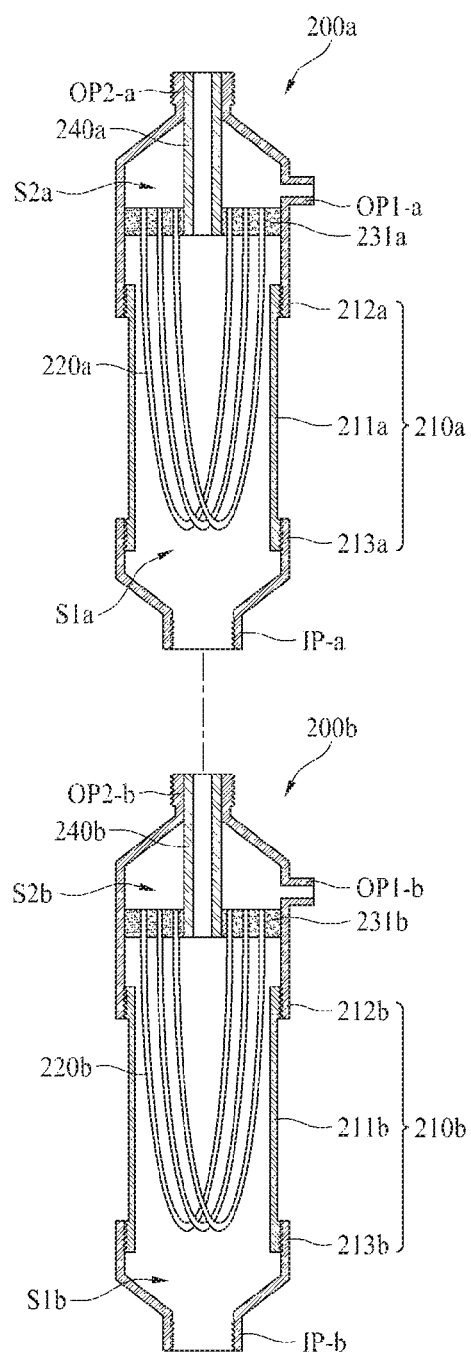
FIG. 2 schematically shows hollow fiber membrane modules according to the second embodiment of the present invention and a filtration apparatus manufactured using the same.

As illustrated in FIG. 2, the filtration apparatus according to the second embodiment of the present invention comprises first and second hollow fiber membrane modules (200a, 200b).

The first pressurized-type hollow fiber membrane module (200a) comprises a first case (210a) including a first inlet port (IP-a) for introducing feed water (and air for aeration cleaning) (i.e., first feed water inlet port) and a first outlet port (OP2-a) for ventilation (and for discharging overflow/concentrated water) (i.e., first air outlet port), and first hollow fiber membranes (220a) in the first case (210a). The first case (210a) further comprises a first filtrate outlet port (OP1-a) for discharging filtrate.

The first case (210a) comprises a first tubular body (211a) both ends of which are open, a first upper cap (212a) detachably coupled to one end of the first tubular body (211a) and having the first air outlet port (OP2-a), and a first lower cap (213a) detachably coupled to the other end of the first tubular body (211a) and having the first feed water inlet port (IP-a).

A first fixing part (231a) is watertightly adhered to the inner circumferential surface of the first upper cap (212a). Just like the aforementioned first fixing part (131a) of the first embodiment of the present invention, the first fixing part (231a) may be formed of polymer such as polyurethane resin, silicon resin, epoxy resin, and etc.

The first fixing part (231a) divides the inner space of the first case (210a) into a filtration space (S1a) and non-filtration space (S2a). That is, the non-filtration space (S2a) is defined by the first upper cap (212a) and first fixing part (231a), and the filtration space (S1a) is defined by the first fixing part (231a), first tubular body (211a), and first lower cap (213a).

The filtration space (S1a) is configured to receive the feed water to be treated through the first feed water inlet port (IP-a), and the non-filtration space (S2a) is in fluid communication with the first filtrate outlet port (OP1-a) provided on the first upper cap (212a).

Alternatively, the first fixing part (231a) may be watertightly adhered to the inner circumferential surface of the first tubular body (211a) at the place adjacent to the first upper cap (212a). In this instance, while the first filtrate outlet port (OP1-a) which is in fluid communication with the non-filtration space (S2a) may be provided on the first upper cap (212a) as shown in FIG. 2, it may also be provided on the first tubular body (211a) at the place right above the first fixing part (231a).

Both ends of each first hollow fiber membrane (220a) are potted in the first fixing part (231a). The body portion of the first hollow fiber membrane (220a) which performs the filtering process is disposed in the filtration space (S1a). The first hollow fiber membrane (220a) is in fluid communication with the non-filtration space (S2a) through the both ends thereof which are open. In other words, the filtrate passing through the body portion of the first hollow fiber membrane (220a) within the filtration space (S1a) flows into the non-filtration space (S2a) via the lumen of the first hollow fiber membrane (220a).

Just like the aforementioned first hollow fiber membranes (120a) of the first embodiment of the present invention, the first hollow fiber membranes (220a) may also be formed of at least one of polysulfone, polyethersulfone, sulfonated polysulfone, polyvinylidene fluoride (PVDF), polyacrylonitrile, polyimide, polyamideimide, and polyesterimide. In addition, the first hollow fiber membrane (220a) may be a single-layer membrane or a composite membrane.

Since both ends of the first hollow fiber membrane (220a) are potted in the same first fixing part (231a) and the first upper cap (212a) and first lower cap (213a) are detachably coupled to the first tubular body (211a), the body portion of the first hollow fiber membrane (220a) which performs the filtering process can be exposed by detaching the first upper cap (212a) and/or first lower cap (213a) from the first tubular body (211a). Hence, when any one of the first hollow fiber membranes (220a) is damaged, the damaged hollow fiber membrane can be repaired (e.g., by patching or soldering), and thus the life period of the module (200a) can be extended without deteriorating the filtration efficiency thereof.

As shown in FIG. 2, the first pressurized-type hollow fiber membrane module (200a) further comprises a first tube (240a). The first tube (240a) crosses the non-filtration space (S2a) which is in fluid communication with the first hollow fiber membranes (220a). The first air outlet port (OP2-a) and the filtration space (S1a) are in fluid communication with each other through the first tube (240a).

The first tube (240a) isolates the non-filtration space (S2a) from the first air outlet port (OP2-a) so that the non-filtration space (S2a) and the first air outlet port (OP2-a) are not in fluid communication with each other. For this sake, one end of the first tube (240a) is potted in the first fixing part (231a) and the other end of the first tube (240a) is watertightly coupled to the first air outlet port (OP2-a).

Although not shown, O-ring(s) for sealing may be interposed between the first tube (240a) and the first fixing part (231a) and/or between the first tube (240a) and the first air outlet port (OP2-a).

The second pressurized-type hollow fiber membrane module (200b) has a structure almost identical with that of the first pressurized-type hollow fiber membrane module (200a). That is, the second pressurized-type hollow fiber membrane module (200b) comprises a second case (210b) including a second inlet port (i.e., second feed water inlet port) (IP-b) for introducing feed water and a second outlet port (i.e., second air outlet port) (OP2-b) for ventilation (and discharging overflow/concentrated water), and second hollow fiber membranes (220b) in the second case (210b).

As illustrated in FIG. 2, the first inlet port (IP-a) of the first pressurized-type hollow fiber membrane module (200a) and the second outlet port (OP2-b) of the second pressurized-type hollow fiber membrane module (200b) are coupled to each other so that the first and second pressurized-type hollow fiber membrane modules (200a, 200b) can be in fluid communication with each other. For this sake, the second outlet port (OP2-b) of the second pressurized-type hollow fiber membrane module (200b) may be inserted into the first inlet port (IP-a) of the first pressurized-type hollow fiber membrane module (200a), and vice versa.

For example, as shown in FIG. 2, the second outlet port (OP2-b) of the second pressurized-type hollow fiber membrane module (200b) may have a thread on the outer circumferential surface thereof and the first inlet port (IP-a) of the first pressurized-type hollow fiber membrane module (200a) may have a thread groove on the inner circumferential surface thereof. On the contrary, the first inlet port (IP-a) of the first pressurized-type hollow fiber membrane module (200a) may have a thread on the outer circumferential surface thereof and the second outlet port (OP2-b) of the second pressurized-type hollow fiber membrane module (200b) may have a thread groove on the inner circumferential surface thereof.

According to the aforementioned filtration apparatus of the second embodiment of the present invention, the filtration space (S1a) of the first pressurized-type hollow fiber membrane module (200a) and the filtration space (S1b) of the second pressurized-type hollow fiber membrane module (200b) are in fluid communication with each other through the second tube (240b).

Hereinafter, the way how the filtration apparatus according to the second embodiment of the present invention operates will be described in detail.

As the feed water to be treated (and air for aeration cleaning) is introduced into the filtration apparatus via the second inlet port (IP-b) of the second pressurized-type hollow fiber membrane module (200b), the filtration spaces (S1b, S1a) of the second and first pressurized-type hollow fiber membrane modules (200b, 200a) get filled with the feed water sequentially, and the ventilation is performed through the first air outlet port (OP2-a) of the first pressurized-type hollow fiber membrane module (200a).

Then, by controlling a valve (not shown), the first air outlet port (OP2-a) is closed. The filtrate produced through the pressurizing filtration is introduced into the non-filtration spaces (S2a, S2b) of the first and second pressurized-type hollow fiber membrane modules (200a, 200b) respectively, and then discharged from the filtration apparatus via the first and second filtrate outlet ports (OP1-a, OP1-b) respectively.

For backwashing process, the valves (not shown) are controlled to close the second inlet port (IP-b) and open the first air outlet port (OP2-a). Subsequently, the backwashing water is introduced into the non-filtration spaces (S2a, S2b) of the first and second pressurized-type hollow fiber membrane modules (200a, 200b) via the first and second filtrate outlet ports (OP1-a, OP1-b), thereby performing the backwashing process. The overflow/concentrated water that is produced during the backwashing process is discharged from the filtration apparatus through the first air outlet port (OP2-a).

After the filtration process, the feed water/concentrated water remaining in the filtration apparatus is drained through the second inlet port (IP-b).

According to the aforementioned second embodiment of the present invention, the only thing required to do is to serially connect the first and second pressurized-type hollow fiber membrane modules (200a, 200b) to each other, and thus a filtration apparatus can be easily assembled/installed. Furthermore, the water treatment capacity of the filtration apparatus can be improved without increasing the footprint of the filtration apparatus and length of the hollow fiber membranes (220a, 220b).

Hereinafter, referring to FIG. 3, the first and second hollow fiber membrane modules (300a, 300b) according to the third embodiment of the present invention and a filtration apparatus manufactured using the same will be described in detail.

Figure 3:
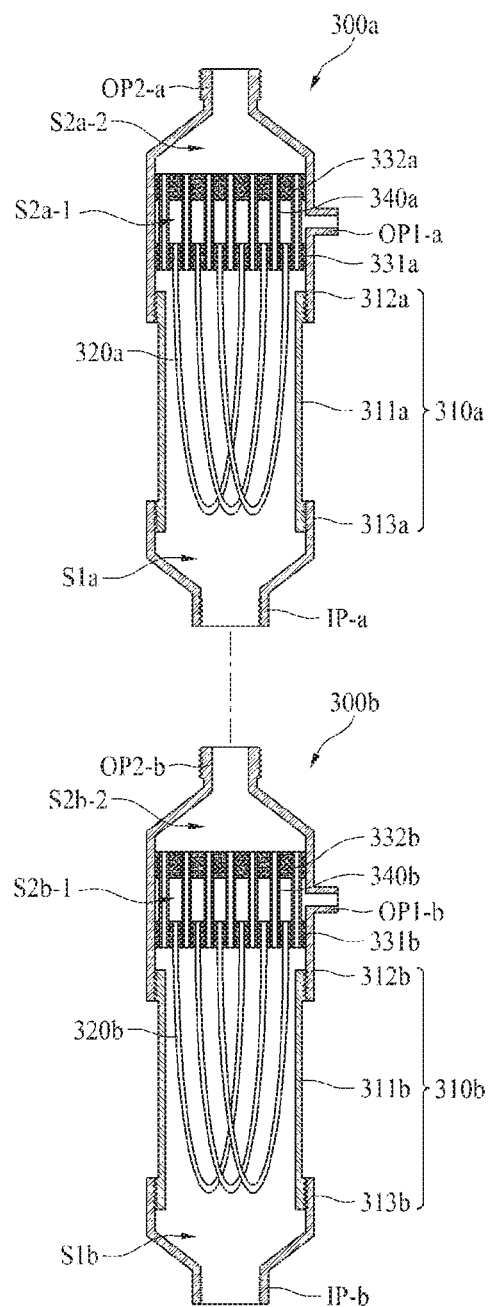
FIG. 3 shows hollow fiber membrane modules according to the third embodiment of the present invention and a filtration apparatus manufactured using the same.

As illustrated in FIG. 3, the hollow fiber membrane module (300a, 300b) constituting the filtration apparatus according to the third embodiment of the present invention is identical with the hollow fiber membrane module (200a, 200b) constituting the filtration apparatus according to the second embodiment of the present invention except that (i) the module (300a, 300b) further comprises an auxiliary fixing part (332a, 332b) which divides the non-filtration space (S2a, S2b) into a filtrate space (S2a-1, S2b-1) and an air space (S2a-2, S2b-2), (ii) the filtrate space (S2a-1, S2b-1) is in fluid communication with the hollow fiber membranes (320a, 320b) and the filtrate outlet port (OP1-a, OP1-b) respectively, and (iii) the module (300a, 300b) further comprises a plurality of tubes (340a, 340b) each of which has two ends potted in the fixing part (331a, 331b) and the auxiliary fixing part (332a, 332b) respectively so that the filtration space (S1a, S1b) is in fluid communication with the air space (S2a-2, S2b-2) through the tubes (340a, 340b).

While it is shown in FIG. 3 that the fixing part (331a, 331b) and auxiliary fixing part (332a, 332b) are watertightly adhered to the inner circumferential surface of the upper cap (312a, 312b), it is also possible for them to watertightly adhere to the inner circumferential surface of the upper part of the tubular body (311a, 311b).

Further, it is also possible for the fixing part (331a, 331b) and auxiliary fixing part (332a, 332b) to watertightly adhere to the inner circumferential surface of the upper part of the tubular body (311a, 311b) and the inner circumferential surface of the upper cap (312a, 312b), respectively. In this instance, the filtrate outlet port (OP1-a, OP1-b) may be provided on either the tubular body (311a, 311b) or the upper cap (312a, 312b) at the place between the fixing part (331a, 331b) and the auxiliary fixing part (332a, 332b).

Hereinafter, the way how the filtration apparatus according to the third embodiment operates will be described in detail.

As the feed water to be treated (and air for aeration cleaning) is introduced into the filtration apparatus through the second inlet port (IP-b) of the second pressurized-type hollow fiber membrane module (300b), the filtration spaces (S1b, S1a) of the second and first pressurized-type hollow fiber membrane modules (300b, 300a) get filled with the feed water sequentially and the ventilation is performed through the first air outlet port (OP2-a) of the first pressurized-type hollow fiber membrane module (300a).

Then, by controlling a valve (not shown), the first air outlet port (OP2-a) is closed. The filtrate produced through the pressurizing filtration is introduced into the filtrate spaces (S2a-1, S2b-1) of the first and second pressurized-type hollow fiber membrane modules (300a, 300b) respectively, and then discharged from the filtration apparatus via the first and second filtrate outlet ports (OP1-a, OP1-b) respectively.

For backwashing process, the valves (not shown) are controlled to close the second inlet port (IP-b) and open the first air outlet port (OP2-a). Subsequently, the backwashing water is introduced into the filtrate spaces (S2a-1, S2b-1) of the first and second pressurized-type hollow fiber membrane modules (300a, 300b) via the first and second filtrate outlet ports (OP1-a, OP1-b), thereby performing the backwashing process. The overflow/concentrated water that is produced during the backwashing process is discharged from the filtration apparatus through the first air outlet port (OP2-a).

After the filtration process, the feed water/concentrated water remaining in the filtration apparatus is drained through the second inlet port (IP-b).

According to the aforementioned third embodiment of the present invention, the only thing required to do is to serially connect the first and second pressurized-type hollow fiber membrane modules (300a, 300b) to each other, and thus a filtration apparatus can be easily assembled/installed. Furthermore, the water treatment capacity of the filtration apparatus can be improved without increasing the footprint of the filtration apparatus and length of the hollow fiber membranes (320a, 320b).

Figure 4A:
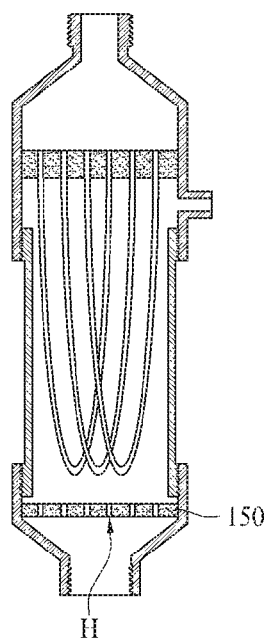
FIGS. 4A, 4B and 4C respectively show hollow fiber membrane modules according to the first to third embodiments of the present invention each of which has a distribution plate.
Figure 4B:
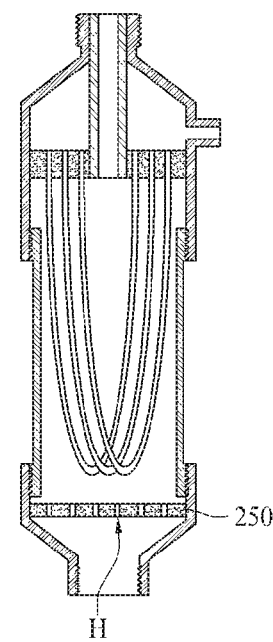
Figure 4C:
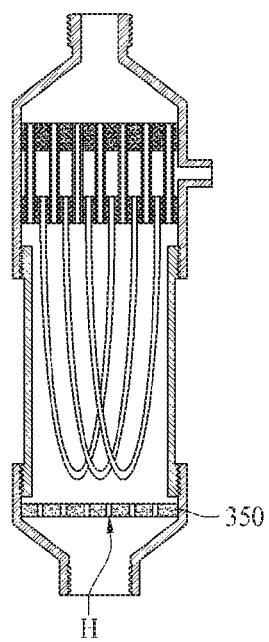

FIGS. 4A, 4B and 4C respectively show hollow fiber membrane modules according to the first to third embodiments of the present invention each of which has a distribution plate (150, 250, 350).

That is, each of the hollow fiber membrane modules according to the first to third embodiments of the present invention may further comprise a distribution plate (150, 250, 350) disposed in the case at a place adjacent to the feed water inlet port and having a plurality of holes (H).

The air for aeration cleaning which is introduced into the case through the feed water inlet port along with or separately from the feed water can be distributed to the hollow fiber membranes uniformly by the distribution plate (150, 250, 350), and thus the non-uniform aeration cleaning as well as the rapid contamination of the hollow fiber membranes which might be caused thereby can be prevented.

While a top-collecting method is applied to the second and third embodiments as explained above, it is also possible to apply a bottom-collecting method by arrange the modules upside down. In this instance, the functions of the feed water inlet port and air outlet port will be switched.

In addition, although a case having a tubular body and upper/lower caps coupled to each other using screw technique is illustrated above, the tubular body and upper/lower caps may also be coupled to each other using other techniques, e.g., clamp technique.

The invention claimed is:

1. An extendable pressurized-type hollow fiber membrane module comprising:
   a case including a feed water inlet port, a filtrate outlet port, and an air outlet port for ventilation;
   a fixing part disposed inside the case, the fixing part dividing an inner space of the case into a non-filtration space and a filtration space, the filtration space configured to receive feed water to be treated through the feed water inlet port, at least a portion of the non-filtration space being in fluid communication with the filtrate outlet port;
   a hollow fiber membrane in the filtration space, both ends of the hollow fiber membrane being potted in the fixing part in such a way that the hollow fiber membrane are in fluid communication with the at least a portion of the non-filtration space; and
   a tube crossing the at least a portion of the non-filtration, the air outlet port and the filtration space being in fluid communication with each other through the tube.

2. The extendable pressurized-type hollow fiber membrane module of claim 1, wherein the tube isolates the non-filtration space from the air outlet port so that the non-filtration space is not in fluid communication with the air outlet port.

3. The extendable pressurized-type hollow fiber membrane module of claim 2, wherein:
   one end of the tube is potted in the fixing part, and
   the other end of the tube is watertightly coupled to the air outlet port.

4. The extendable pressurized-type hollow fiber membrane module of claim 1, further comprising an auxiliary fixing part dividing the non-filtration space into a filtrate space and an air space, wherein:
   the filtrate space is in fluid communication with the hollow fiber membrane and the filtrate outlet port, respectively, and
   both ends of the tube are potted in the fixing part and the auxiliary fixing part, respectively, so that the filtration space and the air space are in fluid communication with each other through the tube.

5. The extendable pressurized-type hollow fiber membrane module of claim 1, wherein:
   the air outlet port has a thread on an outer circumferential surface thereof, and
   the feed water inlet port has a thread groove on an inner circumferential surface thereof.

6. The extendable pressurized-type hollow fiber membrane module of claim 1, wherein:
   the air outlet port has a thread groove on an inner circumferential surface thereof, and
   the feed water inlet port has a thread on an outer circumferential surface thereof.

7. The extendable pressurized-type hollow fiber membrane module of claim 1, wherein:
   the case comprises:
   a tubular body, both ends of the tubular body being open;
   an upper cap detachably coupled to one end of the tubular body, the upper cap including the filtrate outlet port and the air outlet port; and
   a lower cap detachably coupled to the other end of the tubular body, the lower cap including the feed water inlet port,
   the fixing part is disposed in the upper cap, and
   the non-filtration space is defined by the upper cap and the fixing part.

8. The extendable pressurized-type hollow fiber membrane module of claim 1, wherein:
   the case comprises:
   a tubular body, both ends of the tubular body being open;
   an upper cap detachably coupled to one end of the tubular body, the upper cap including the filtrate outlet port and the air outlet port; and
   a lower cap detachably coupled to the other end of the tubular body, the lower cap including the feed water inlet port,
   the fixing part is disposed in the tubular body at a place adjacent to the upper cap, and
   the non-filtration space is defined by the upper cap and the fixing part.

9. The extendable pressurized-type hollow fiber membrane module of claim 1, further comprising a distribution plate disposed in the case at a place adjacent to the feed water inlet port, the distribution plate having a plurality of holes.

* * * * *